United States Patent
LaGrange et al.

[11] Patent Number: 5,914,708
[45] Date of Patent: *Jun. 22, 1999

[54] COMPUTER INPUT STYLUS METHOD AND APPARATUS

[75] Inventors: George W. LaGrange; George E. Gerpheide, both of Salt Lake City; Richard D. Woolley, Orem; Tom Donohue, Provo; Mike Layton, Salt Lake City, all of Utah

[73] Assignee: Cirque Corporation, SLC, Utah

[*] Notice: This patent issued on a continued prosecution application filed under 37 CFR 1.53(d), and is subject to the twenty year patent term provisions of 35 U.S.C. 154(a)(2).

[21] Appl. No.: 08/626,284

[22] Filed: Apr. 4, 1996

[51] Int. Cl.$^6$ .......................................................... G09G 5/00
[52] U.S. Cl. ................... 345/179; 178/19.01; 178/19.03; 178/18.06
[58] Field of Search ............................ 178/18, 19, 18.06, 178/19.01, 19.03, 19.04; 345/179, 173, 174, 175

[56] References Cited

U.S. PATENT DOCUMENTS

| | | |
|---|---|---|
| 4,580,007 | 4/1986 | Searby et al. . |
| 4,644,101 | 2/1987 | Jin et al. . |
| 4,786,764 | 11/1988 | Padula et al. . |
| 4,883,926 | 11/1989 | Baldwin . |
| 5,004,872 | 4/1991 | Lesley . |
| 5,107,541 | 4/1992 | Hilton . |
| 5,290,972 | 3/1994 | Someya et al . |
| 5,357,062 | 10/1994 | Rockwell et al. . |
| 5,365,461 | 11/1994 | Stein et al. . |
| 5,365,598 | 11/1994 | Sklarew . |
| 5,384,688 | 1/1995 | Rockwell . |
| 5,410,334 | 4/1995 | Comerford . |
| 5,453,759 | 9/1995 | Seebach . |
| 5,459,489 | 10/1995 | Redford . |
| 5,461,204 | 10/1995 | Makinwa et al. . |
| 5,488,204 | 1/1996 | Mead et al. . |

Primary Examiner—Richard A. Hjerpe
Assistant Examiner—Kent Chang
Attorney, Agent, or Firm—Morriss, Bateman, O'Bryant & Compagni

[57] ABSTRACT

A system comprising a conductive stylus used in conjunction with a capacitance sensitive touch pad, said system providing at least two different signals to an associated computer system. The stylus is a pen-like device having an actuable switch which when actuated substantially increases the capacitive disturbance caused by the conductive stylus on the touch pad. Before actuation, the stylus creates a capacitive disturbance sufficient for circuitry in the touch pad to measure as crossing a first predefined capacitive disturbance threshold when the foam covered conductive stylus tip is brought in contact with the surface of the touch pad. When the switch is actuated, the capacitive disturbance measured by the touch pad increases sufficient to cross a second predefined capacitive disturbance threshold. An associated computer program for drawing on a computer display places a cursor on the display when the first threshold is crossed. The computer program begins drawing on the display beginning at the cursor location when the switch is actuated causing the second threshold to be crossed. Placing a conductive foam cover over the conductive stylus tip results in the measured capacitive disturbance being amplified to thereby increase the magnitude of the capacitive disturbance of the stylus.

18 Claims, 6 Drawing Sheets

COMPUTER INPUT STYLUS METHOD AND APPARATUS

BACKGROUND OF THE INVENTION

1. Field of the Invention

This invention pertains to a computer input system. More specifically, the invention pertains to a stylus used in conjunction with a capacitance sensitive computer input pad (touch pad) which measures the magnitude of a capacitive disturbance caused by an object touching the touch pad surface. The tip of a stylus is placed in contact with the touch pad surface and a mannually manupulable element of the stylus enables a user to adjust the magnitude of capacitive disturbance which the stylus creates on the touch pad surface.

2. State of the art

Many computer input devices have been developed to accommodate the different object positioning sensing methods and apparati available. In the field of touch sensitive computer input pads (touch pads) in particular, various object sensing and position determining technologies have been used and refined to increase reliability and accuracy. For example, pressure sensitive touch pads enabled any object which could be pressed against the touch pad surface at a localized point and then moved along the surface to cause a corresponding movement of a cursor on a computer display. A stylus has often been integrated with the touch pad to provide a pointing device other than a finger. The stylus provides certain advantages which a finger cannot, and is therefore preferred over a finger in certain applications. By pressing firmly against the touch pad with the tip of a stylus, a user can develop the same pressure against the touch pad as a finger. Unfortunately, various drawbacks with pressure sensitive touch pads have limited their use.

Object position sensing technology is not limited to pressure sensitive devices. For example, other position sensing approaches include infrared sensing, acoustic wave sensing, piezoelectric force sensing, electromagnetic sensing, electrostatic sensing, sonic pulse sensing and capacitive sensing. A stylus is typically used with these sensing technologies, for example, when the intuitive feeling of a pen-like device is preferred such as in an application requiring "painting" or "drawing" with a computer. Another situation where a stylus is preferred is when other more cumbersome input devices cannot be used such as where the user is mobile and where handwriting recognition software is available.

The physical properties of the particular stylus used in conjunction with the above technologies varies. For example, on a pressure sensitive touch pad, the stylus may be any object which provides a relatively well defined point which can be clearly "seen" by the sensing technology. Such a stylus is taught in U.S. Pat. No. 5,365,598 issued to Sklarew. Disadvantageously, the stylus is required to make good contact at all times with the touch pad to minimize adding resistance that would lower the voltage detected by the touch pad, and result in an erroneous position determination. Therefore, the user must be careful to apply sufficient and consistent pressure, but without damaging the touch pad. The stylus position is determined by sensing the voltage in an X and Y axis on a conductive sheet on which the stylus is pressed. Voltages will vary with the distance of the stylus tip from the conductive edges of the touch pad surface.

Other position sensing and determining technologies are responsive to both the touch of a finger and an inanimate object such as a stylus. U.S. Pat. No. 5,365,461 issued to Stein et al. is an example of such a device. In particular, this invention apparently teaches that it is possible to distinguish between the human touch and the touch of the inanimate object. The preferred embodiment applies the capacitive sensing technology which enables the inanimate object to be detected by supplying a current to the object and then determining the current flow though the object into the conductive coating. Necessarily, the stylus is conductive. However, the conductivity cannot be modified.

This and other advantages of capacitance sensitive touch pads has resulted in several variations to try and improve the technology. For example, U.S. Pat. No. 3,921,166 issued to Volpe teaches a capacitive matrix which the touch of a finger can cause to vary the transcapacitance of the touch pad.

In a similar manner, U.S. Pat. No. 4,455,452 issued to Schulyer teaches a capacitive touch pad where a finger attenuates the capacitive coupling between touch pad electrodes.

A patent which specifically addresses a stylus was issued to Rympalski as U.S. Pat. No. 4,639,720. The stylus is said to alter the transcapacitance coupling between touch pad electrodes.

U.S. Pat. No. 5,149,919 issued to Greanias teaches a system whereby a stylus position is determined by detecting which matrix wires are carrying the strongest signal, thus indicating the position of the stylus tip.

Much of the detail about the styli used in conjunction with the references above describes how the styli can cause some type of capacitive disturbance which is detectable by the touch pads. This disturbance is caused, for example, by supplying a voltage to the stylus tip as in Stein et al. The Sklarew patent also refers to other styli which can use light in the form of ultraviolet, infrared or even microwave which is scanned by the touch pad, as well as resistive, capacitive or inductive coupling with the styli. It is important to remember that the present invention, however, is limited to capacitance sensitive touch pads such as the one taught in Gerpheide, U.S. Pat. No. 5,305,017. The Gerpheide patent discloses devices and methods which overcome the drawbacks inherent in other devices which utilize a sensing tablet or sensing surface. The devices and methods of the Gerpheide patent include a touch sensitive input pad upon which a user conveniently inputs position information by positioning the user's finger tip in close proximity to the top surface of the position sensing surface of the touch sensitive pad. The device of the Gerpheide patent detects the position of the finger tip in the x and y directions of the touch pad as well as the finger's proximity in the z direction in relation to the sensing surface. In addition to a finger, the pointing object can be any other conductive object such as the stylus which is the subject of the present invention.

The present invention is limited to capacitance sensitive touch pads for several reasons. First, it is useful to recognize one significant limitation common to the styli which work with capacitance sensitive touch pads. This limitation is related to the position sensing technology being either an "on" or "off" binary result. In other words, the stylus is either in contact with the touch pad, or it's not. Therefore, it is unknown in the art to provide more information from the stylus other than its position as determined by the sensing technology.

It would therefore be an advantage over the state of the art to provide a stylus which works on a capacitance sensitive touch pad which can provide more information to the touch pad/computer system than its location without adding to the complexity of the stylus or affecting its reliability. It would thus be an advantage to provide a stylus which could provide this greater amount of information through a simple mannual adjustment. It would also be an advantage to provide this greater amount of information without resorting to providing power to the stylus and thereby increasing complexity, bulk and cost. It would be a further advantage to provide this greater amount of information without having to add hardware external to the stylus body.

OBJECTS AND SUMMARY OF THE INVENTION

It is an object of the invention to provide a method and apparatus for using a conductive stylus which does not require a secondary coupling to the touch pad, other than a tip of the stylus, in order to provide more than just stylus position information.

It is another object of the invention to provide a method and apparatus for using a conductive stylus which may be mannually manipulated to cause a change in the capacitive disturbance caused by contact of the stylus tip with the touch pad, and thus provide additional information.

Still another object of the invention is to provide mechanism for amplifying the capacitive disturbance caused by the stylus tip being in contact with the touch pad, to thereby more easily provide distinguishable capacitive disturbance regions.

These and other objects of the present invention are realized in a preferred embodiment of a stylus system which includes a capacitance sensitive touch pad and a conductive stylus, said system providing at least two different signals to an associated computer system. The stylus is a pen-like device having an actuable mechanical switch which, when actuated, substantially increases the capacitive disturbance caused by the stylus. Before actuation, the stylus develops a capacitive disturbance sufficient for circuitry in the touch pad to measure as exceeding a first predefined capacitive disturbance threshold when the stylus tip is brought in contact with the surface of the touch pad. When the mechanical switch is actuated, the capacitive disturbance measured by the touch pad increases sufficiently to exceed a second predefined capacitive disturbance threshold.

In accordance with one aspect of the invention, a conductive foam cap may be placed over the stylus tip, to amplify the measured capacitive disturbance, to thereby increase the distance between the first and second capacitive disturbance thresholds. This reduces the possibility of an unusually high or erroneous capacitive disturbance measurement (when the mechanical switch is not actuated) from inadvertently exceeding the second capacitive disturbance threshold. The different thresholds enable different functions to be carried out by software associated with the system without introducing complex, costly or bulky circuitry to provide the two different signals to the computer system.

The invention allows a stylus which has no other connection to the capacitance sensitive touch pad or computer system, to provide more than one signal, by simply varying the capacitive disturbance caused by the stylus. Furthermore, no external or internal power supply to the stylus is required to provide these signals. The method and apparatus which are used to determine the position of the stylus on the touch pad is the same circuitry which is used to determine the intensity of the capacitive disturbance. Therefore, no additional circuitry must be provided, other than circuitry associated with the touch pad which can provide an indication of the strength of a capacitive disturbance on the touch pad, as well as its location thereon.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

When considering the present invention, it is important to remember from the outset that it is limited to a stylus operating in conjunction with a capacitance sensitive touch pad. The modifications to the stylus are a result of two desirable characteristics. First, it is preferred that the stylus not be required to have a power supply in order to change the capacitive disturbance it creates when in contact with a touch pad. Second, it is critical that no physical connection be required between the stylus and the touch pad other than the tip of the stylus on the touch pad surface in order to provide information to the touch pad other than position of the stylus.

Figure 1:
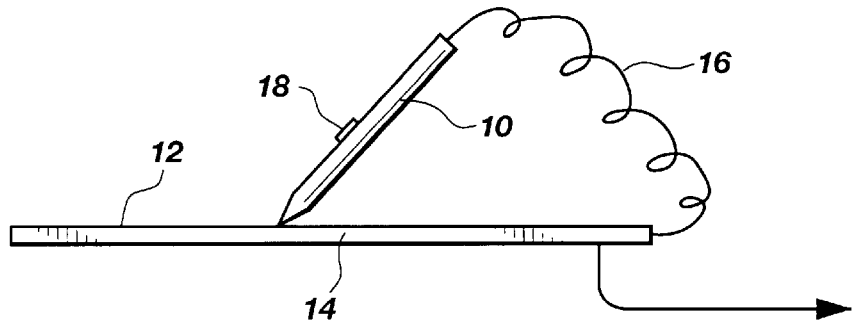
FIG. 1 is a diagram of the components and interconnections therebetween of a system of the prior art, including a stylus and touch pad.

To assist in understanding the advantages of the method and apparatus provided by the present invention, it is helpful to compare some systems in the prior art which also use a stylus and capacitance sensitive touch pad. FIG. 1 shows a diagram of the components and interconnections of one such system in the prior art. The stylus 10 is shown touching the surface 12 of the touch pad 14. The touch pad 14 can be a capacitance sensitive device. As shown, the stylus 10 has a cord 16 attached to it, and a switch 18 is located along the length of the stylus. The cord provides signals from the stylus to an associated computer system either through the touch pad 14 or through the cord 16 directly.

Figure 2:
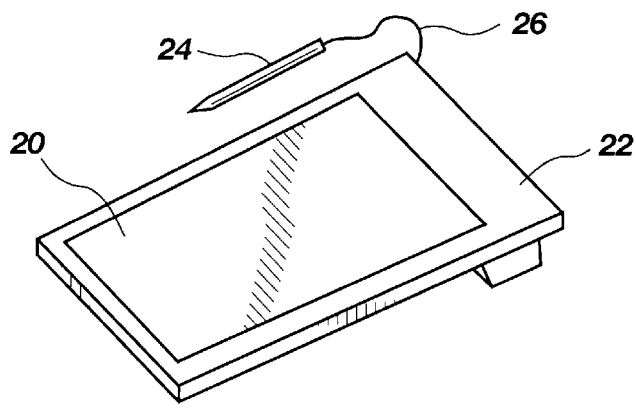
FIG. 2 is a diagram of the components and interconnections therebetween of another system of the prior art, including a stylus and touch pad on a mobile digitizing tablet.

FIG. 2 is provided to show another capacitance sensitive touch pad 20 on a digitizing tablet 22 with an associated stylus 24. The figure depicts a mobile system where the associated computer system is contained within the digitizing tablet 22. A cord 26 is provided between the stylus 24 and the digitizing tablet 22 for purposes other than providing positional information to the tablet 22 about the stylus 22.

Disadvantageously, both systems show a cord 16, 26 from the stylus 10, 24 to a computer or touch pad 14, 22. The styli 10, 24 thus fail to take advantage of the information which is already being provided to the capacitance sensitive touch pads 14, 20 and which can be utilized with possibly no modification to the capacitance sensitive circuitry of the touch pads 14, 20.

Figure 3:
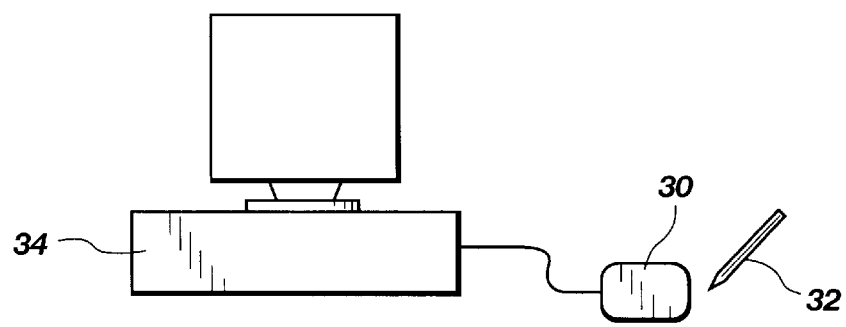
FIG. 3 is a diagram of the components and interconnections therebetween of a system constructed in accordance with the principles of the present invention.

FIG. 3 is an illustration of a capacitive sensitive touch pad 30 and a stylus 32 constructed in accordance with the principles of the present invention. The computer 34 to which the touch pad 30 is connected is also shown to illustrate the entire system and its interconnections. The most significant characteristic of the stylus which the user should immediately recognize is that the stylus 32 is a stand alone device. No cord or other connecting device is required to couple the stylus 32 to a touch pad 30. It will be assumed that the touch pad 30 referred to hereinafter is a capacitance sensing touch pad 30. The touch pad 30 was originally designed only to measures capacitive disturbances to determine where on the touch pad surface an object capable of creating a capacitive disturbance is located.

Before discussing the present invention further, some more background information is helpful in order to understand its advantages. The basis of operation of the stylus in the preferred embodiment comes from a recognition of the basic principle by which the touch pad functions. Capacitive disturbances are created by conductive objects which are capable of altering the electrical fields of the touch pad when they are brought close to those fields. This application incorporates by reference U.S. Pat. No. 5,305,017 issued to Gerpheide which explains in detail the operation of the touch pad. For our purposes it is sufficient to provide the detail given above.

Because the touch pad is capable of sensing capacitive disturbances, it was discovered that the same circuitry which senses the location of a capacitive disturbance ( and thus indicating the location of an object on the touch pad), is also capable of measuring the magnitude of the capacitive disturbance, and providing a signal which is representative of the magnitude of the capacitive disturbance. Recognizing the existence of this magnitude measuring feature about some capacitive sensing touch pads was crucial to the development of the present invention. The stylus of the present invention takes advantage of the capacitive disturbance measurement capabilities of the touch pad by altering its physical characteristics in order to change the magnitude of the capacitive disturbance it creates when in contact with the touch pad.

Figure 4A:
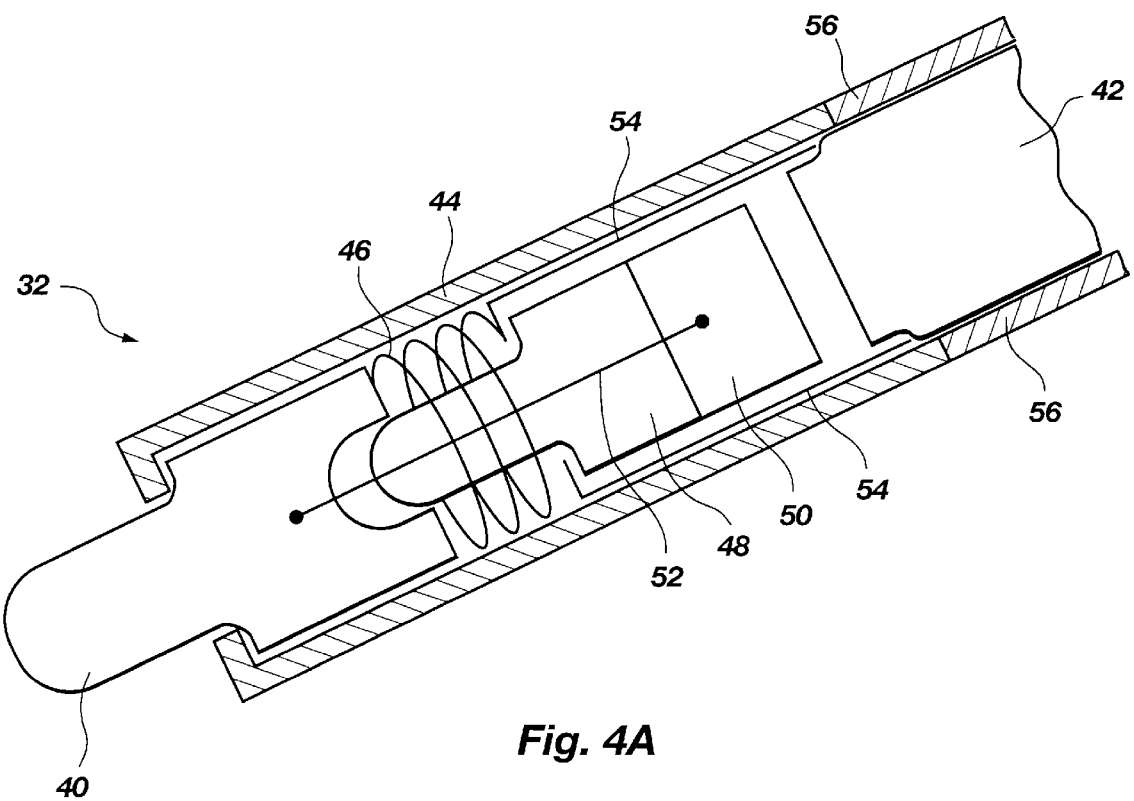
FIG. 4A is a cut-away diagram of a preferred embodiment of the stylus used in conjunction with the components of FIG. 3, showing a mechanical switch in the non-actuated position.

FIG. 4A is a cut-away diagram of the preferred embodiment of the stylus used in conjunction with the touch pad 30 of FIG. 3, with a switch (not shown) in a non-actuated position. The most important elements of the invention are that the stylus is capable of changing a magnitude of the capacitive disturbance which is measured by the touch pad by actuation of a switch means when the stylus has no other contact with the touch pad or the associated computing means other than a conductive stylus tip which makes contact with a surface of the touch pad. Thus the critical elements are a conductive stylus tip 40 for making contact with a surface of the touch pad (not shown), a conductive mass 42 which is electrically insulated from the conductive stylus tip 40, a non-conductive and generally cylindrical stylus casing 44 for housing the conductive stylus tip, and a switch (not shown) disposed in the stylus casing 44 such that said switch can be actuated in order to electrically couple the conductive stylus tip 40 to the conductive mass 42 in order to increase the capacitive disturbance caused by the stylus tip 40 making contact with the touch pad.

The conductive mass 42 is any appropriate material which is electrically conductive and can increase the capacitive disturbance caused by the stylus tip contacting the touch sensitive surface of the touch pad.

There are other elements of the preferred embodiment which should also be explained because they enable the stylus to function as desired. First, the preferred embodiment uses a mechanical switch mechanism which uses an assembly of components between the stylus tip 40 and the conductive mass 42. Disposed against the stylus tip 40 is a spring 46 which keeps tension on the stylus tip 40 and an inner slidable portion 48, 50 to keep the tip 40 and mass 42 separated. The inner slidable portion 48, 50 is comprised of two components: a non-conductive front segment 48, and a conductive back segment 50. Connecting the conductive back segment 50 and the stylus tip 40 is a conductive wire 52. Finally, a slidable housing segment 54 can slide up and down inside the stylus casing 44 in order to compress the spring 46 as will be explained below.

Operation of the stylus 32 depends upon the stylus components being actuable by a switch. That is to say, the components described above are actuable so as to operate in a manner similar to the function of a ball point pen. A ball point pen typically has some switch which causes a slidable ink cartridge to be extended from a casing. Similarly, the actuable switch of the stylus 32 of the present invention causes the conductive mass 42 to be moved toward the conductive stylus tip 40. Movement of the conductive mass 42 causes the slidable housing segment 54 to compress the spring 46 against the stylus tip 40. Movement of the housing segment 54 also allows the conductive mass 42 to push the inner slidable portion 48, 50 until it touches the stylus tip 40. This also means that the conductive mass 42 is in contact with the conductive segment 50, thus coupling the stylus tip 40 to the conductive mass 42.

In a preferred embodiment, the stylus is assumed to be in a non-actuated state as shown in FIG. 4A. Specifically, the inner slidable portion 48, 50 is not in contact with the conductive rear mass 42. This means that when the stylus tip 40 is brought into contact with the surface of the touch pad 30, the capacitive disturbance measured by the touch pad circuitry is limited to that disturbance which is caused by the conductive stylus tip 40 and the conductive segment 50 to which is it attached by the wire 52.

Figure 4B:
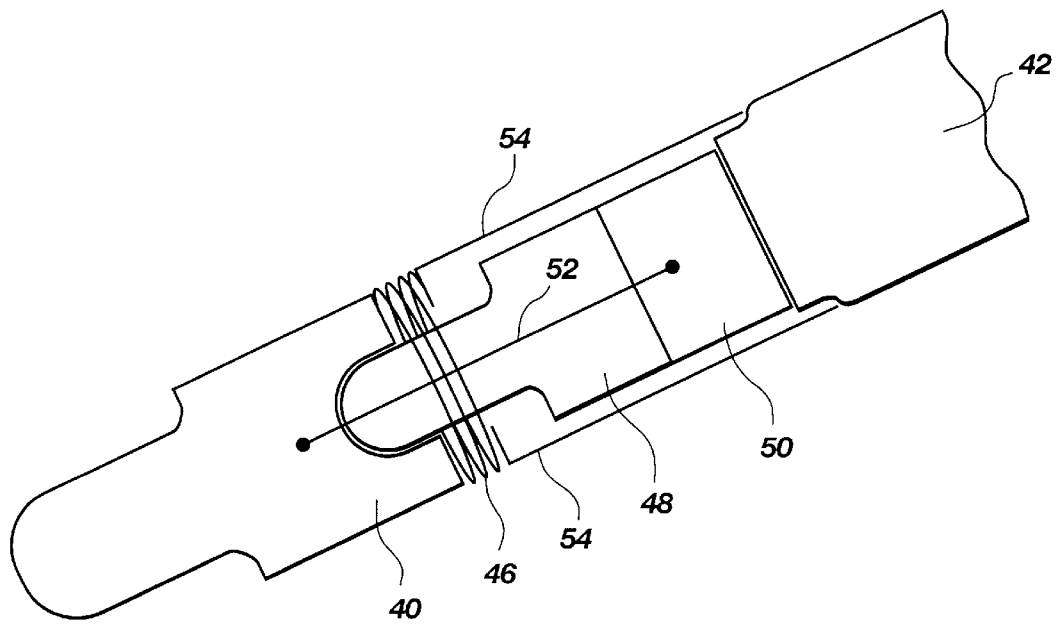
FIG. 4B is a cut-away diagram of a preferred embodiment of the stylus used in conjunction with the components of FIG. 3, showing the mechanical switch in the actuated position.

At this point, the capacitive disturbance sensed by the touch pad 30 is relatively small as compared to the disturbance of a finger or other larger conductive objects which can also be used to touch the touch pad 30. However, when a mechanical switch is actuated, the conductive rear mass 42 slides down through the stylus casing 44 so as to come into contact with the conductive segment 50, as illustrated in FIG. 4B.

The result of bringing the conductive rear mass 42 into electrical contact with the stylus tip 40 via the wire 52 and conductive segment 50 is to substantially increase the total conductive mass which is now in contact with the touch pad 30. Consequently, this increased mass results in a substantial increase in the capacitive disturbance sensed by the touch pad 30.

It is now necessary to discuss several important features of the present invention before continuing. First, it should be realized that the components of the stylus 32 as described in the preferred embodiment of FIG. 4A are only one of many possible designs which enable the stylus 32 to function. What should be remembered is that the purpose of a mechanical switch in the stylus 32 is to cause a substantial increase in the total conductive mass with which the stylus tip 40 is in contact. This can be accomplished in many ways. Some specific alternative embodiments will also be discussed herein.

Another observation to make is that the switch can be, for example, actuable by pressing on an end of the stylus opposite the stylus tip much like a ball point pen. Any mechanical switch can be used as long as it serves the function of joining the stylus tip 40 with a substantially larger conductive mass 42. In that respect, it is worth mentioning that the human body serves as an excellent conductive mass for creating the capacitive disturbance. This is only natural because the touch pad 30 was designed to enable sensing of a finger moving across the touch pad surface. Therefore, the mechanical switch might also be designed to electrically couple the stylus tip 40 to the hand which is holding it.

FIG. 4A also illustrates an embodiment of the present invention where the human body is coupled to the stylus tip 40 via a mechanical switch. This is accomplished, for example, by providing a stylus outer casing 44 which is non-conductive only over the portion which is in contact with the conductive stylus tip 40. This electrically insulates the stylus tip 40 from the user's hand until the mechanical switch is actuated. FIG. 4A shows a portion of the stylus casing 56 which is conductive. When actuated, the mechanical switch electrically couples the stylus tip 40 to the conductive portion of the stylus outer casing 56 by way of a permanent connection between the conductive rear mass 42 and the conductive casing 56. The user's hand becomes part of the large capacitive disturbance which is sensed by the touch pad 30.

A characteristic of the present invention which is not obvious from the description given above is that despite the substantial increase in conductive mass with which the stylus 32 is in contact after a mechanical switch is actuated, the actual capacitive disturbance caused by the stylus tip 40 is not proportionally increased as would be expected. This is most likely due to the small surface area of the stylus tip 40 which is ultimately in contact with the touch pad 30. The relatively small surface area of the stylus tip can only provide a limited surface which can interact with the touch pad 30. Therefore, another mechanism is needed to amplify the capacitive disturbance which can be caused by a larger conductive mass sensed to which the stylus tip is coupled.

Figure 5:
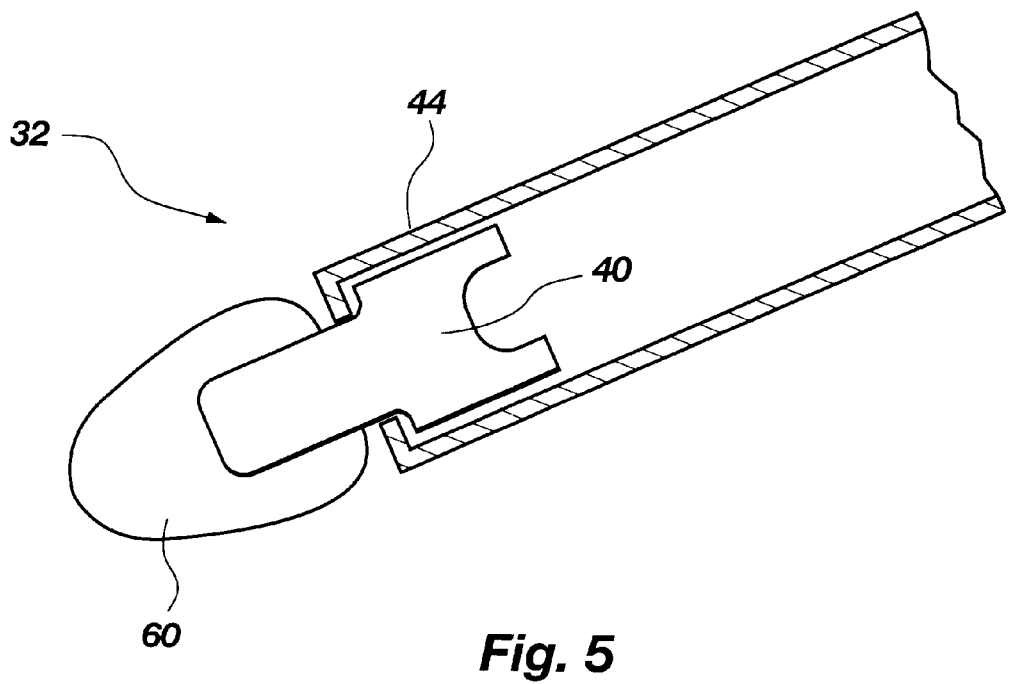
FIG. 5 is a cut-away diagram showing a cover disposed over the stylus tip of FIGS. 4A and 4B.

FIG. 5 is a cut-away diagram of a foam cover 60 slipped over the stylus tip 40 of FIGS. 4A and 4B. The foam cover 60 is comprised of a conductive material which is sufficiently spongy or resilient so that it can be compressed and generally return to its original shape without significant permanent deformation. Those skilled in the art will understand some appropriate foam materials which can be used for this purpose. While deformation should not be permanent, it is very likely that the foam materials might eventually be worn down by repeated compression and movement across the touch pad 30 surface. It will be necessary to either replace the foam cover 60 or find a more rigid material which can sufficiently deform to enable proper stylus function, while providing the increased capacitance disturbance.

The foam cover 60 has the effect of amplifying the capacitive disturbance which is sensed by the touch pad 30. It should be realized that even without actuating a mechanical switch to increase the conductive mass which is in contact with the stylus tip 40, the normal use of the foam covered tip will result in a larger surface area of the stylus 32 being in contact with the touch pad 30. Increased surface area results in a larger capacitive disturbance. When the mechanical switch is actuated, the greater surface area of the stylus tip 40 in contact with the touch pad 30 also results in a greater capacitive disturbance.

Another aspect of the mechanical switch of the stylus 32 is the effect that actuation of the switch has on the foam cover 60. Suppose that the mechanical switch requires additional downward pressure on the stylus tip 40 against the touch pad 30. The result is to flatten the foam cover 60 even more than when the mechanical switch is non-actuated. Therefore, the surface area of the foam cover 60 in contact with the touch pad 30 is much greater than when the mechanical switch is non-actuated.

It should be recognized that even without the mechanical switch to couple a larger conductive mass to the stylus tip 40, simple pressure against the stylus tip 40 which flattens the foam cover and thus increases the surface are of the stylus tip 40 in contact with the touch pad 30 results in an increased capacitive disturbance. However, the increased capacitive disturbance is not likely to be consistent or significantly greater in magnitude than when a more typical pressure is applied to the stylus tip 40 against the touch pad 30 so as to be useful over a range of motion of the stylus 32 and provide reliable operation.

Without quantizing the significance that these greater capacitive disturbances have on the use of the present invention, it is difficult to see the advantages which the stylus 32 of the present invention has over styli 10, 24 in the state of the art. In other words, increasing capacitive disturbance in a step-wise manner (abrupt change) does perform a useful function. Specifically, a program in firmware, software or hardware of a computing means to which the touch pad 30 is connected uses the increase in capacitive disturbance to its advantage.

For example, consider a computer program which is used to draw or sketch on a computer display. The "drawing" or "painting" program, as they are often called, moves a cursor across the computer display corresponding to the motion of a stylus across a touch pad. It is useful to be able to see a cursor on the computer display without having to draw at the cursor location. This enables a user to position the cursor in the proper position before having to begin to draw. Preferably, actuating a mechanical switch on the stylus should then cause writing on the computer display to appear wherever the cursor is moved on the computer display, beginning at the present cursor location.

The present invention enables the above described function to occur by programming the computer to respond to differences in capacitive disturbance detected by the touch pad 30. In a preferred embodiment, a cursor appears and moves on the computer display when the user touches the non-actuated stylus 32 to the touch pad 30. This occurs when the capacitance sensitive touch pad 30 detects a minimal capacitive disturbance which is sufficient to "cross" a first capacitive disturbance threshold. Movement of the stylus tip 40 across the touch pad 30 surface produces a corresponding movement of the cursor on the computer display. Subsequent actuation of the mechanical switch significantly increases the capacitive disturbance detected by the touch pad. This results in the touch pad detecting a "crossing" of a second capacitive disturbance threshold. The computer program is informed of the second threshold crossing and activates the drawing function of the program, beginning at the present location of the cursor on the computer display.

The novelty of the present invention, therefore, is found in the actuable stylus which can alter the capacitive disturbance it causes on the touch pad. By combining the stylus with touch pad circuitry which can detect the magnitude of capacitive disturbance on its surface, a computer can be programmed to respond to threshold crossings. The threshold crossings can be adjusted so that spurious signals are not likely to cause inadvertent drawing on the computer display.

Figure 6:
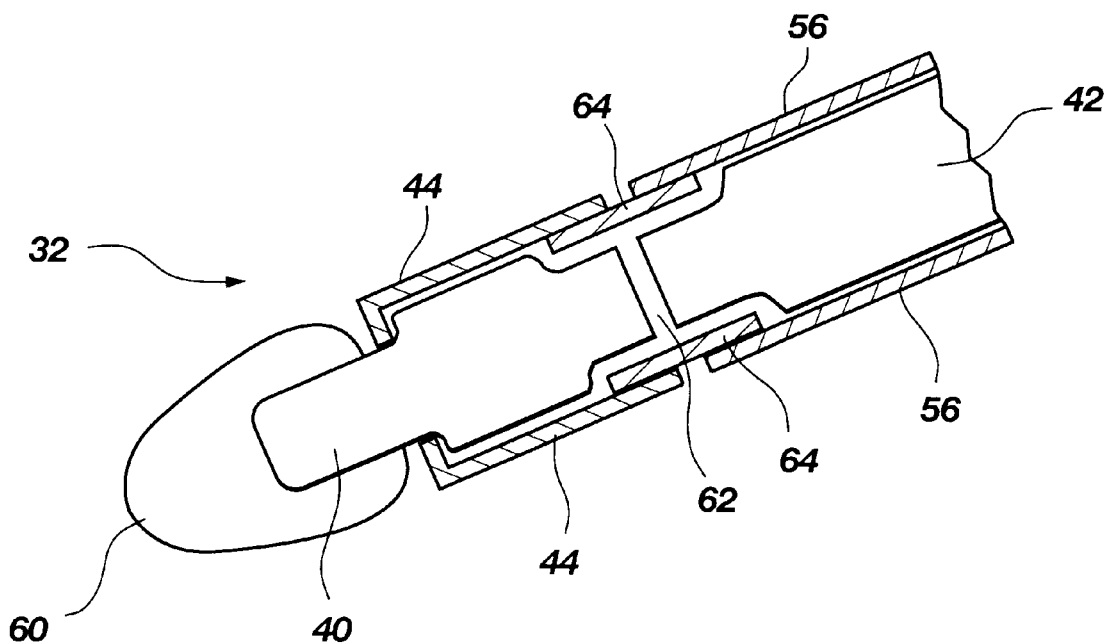
FIG. 6 is a cut-away diagram of an alternative embodiment of the stylus of FIG. 3.

FIG. 6 is an illustration of an alternative embodiment of a stylus shown in cut-away. The stylus 32 uses a different switch means for coupling a large conductive mass 42 to the conductive stylus tip 40. In this embodiment the switch means is simply increased pressure applied to the stylus tip 40. Instead of just flattening out the conductive foam cover 60 over the stylus tip 40, the increased pressure forces together two halves 44, 56 of the stylus casing which may be separated by an air gap 62 or a non-conductive material therebetween. Guide posts 64 keep the stylus casings 44, 56 in line. The non-conductive casing is used for the casing 44 nearest the stylus tip 40, and a conductive casing 56 is used for the portion of the casing furthest from the stylus tip 40.

Pressure reduces the distance between the two halves 44, 56 of the stylus 32 by pressing them closer together until the two halves 44, 56 are touching if there is only an air gap 62. The effectiveness of increasing the capacitive disturbance will be greater if the conductive stylus 40 and the conductive mass 42 actually touch. However, it is possible that increased capacitive coupling between them may be sufficient to cross the second capacitive disturbance threshold of the computer program and begin drawing.

Figure 7:
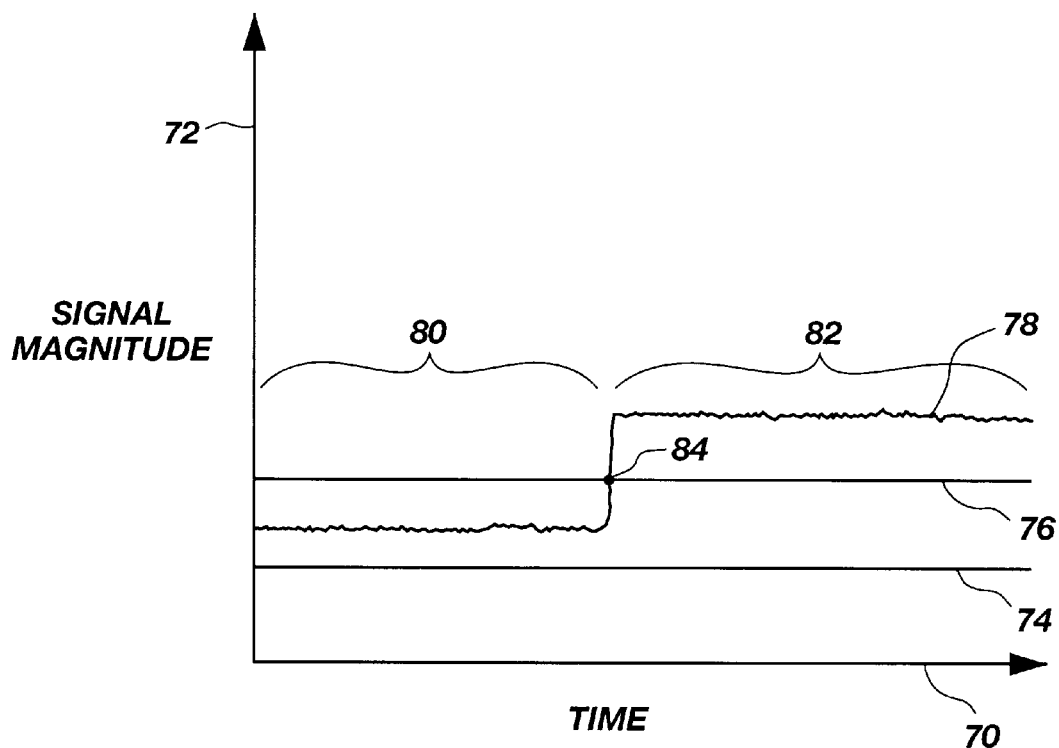
FIG. 7 is a graph showing signal strength (capacitive field disturbance) from the stylus of the present invention, but without the foam cover over the stylus tip.

FIG. 7 is a graph showing capacitive disturbances detected by the touch pad circuitry before and after actuation of the mechanical switch means, but without the foam cover of FIG. 6. The x-axis 70 of the graph is time. The y-axis 72 of the graph denotes the magnitude of the signal from the touch pad circuitry which represents capacitive disturbance. The signal coming from the capacitive disturbance detection circuitry is compared to the predefined first and second capacitive disturbance thresholds of the computer program.

The graph shows the first threshold as line 74, and the second threshold is shown as line 76. Line 78 represents the signal strength from the touch pad circuitry which indicates the magnitude of the capacitive disturbance detected by the touch pad. The portion of line 78 designated as 80 represents the capacitive disturbance caused by the stylus tip 40 in contact with the touch pad 30 with the switch means in a non-actuated position. The portion of line 78 designated as 82 represents the capacitive disturbance caused by the stylus tip 40 in contact with the touch pad 30 with the switch means in an actuated position. The line 78 crosses the second threshold 76 at point 84. The program begins to draw on the computer display until the switch means is deactivated or the stylus tip 40 is raised from off the touch pad 30 surface.

Figure 8:
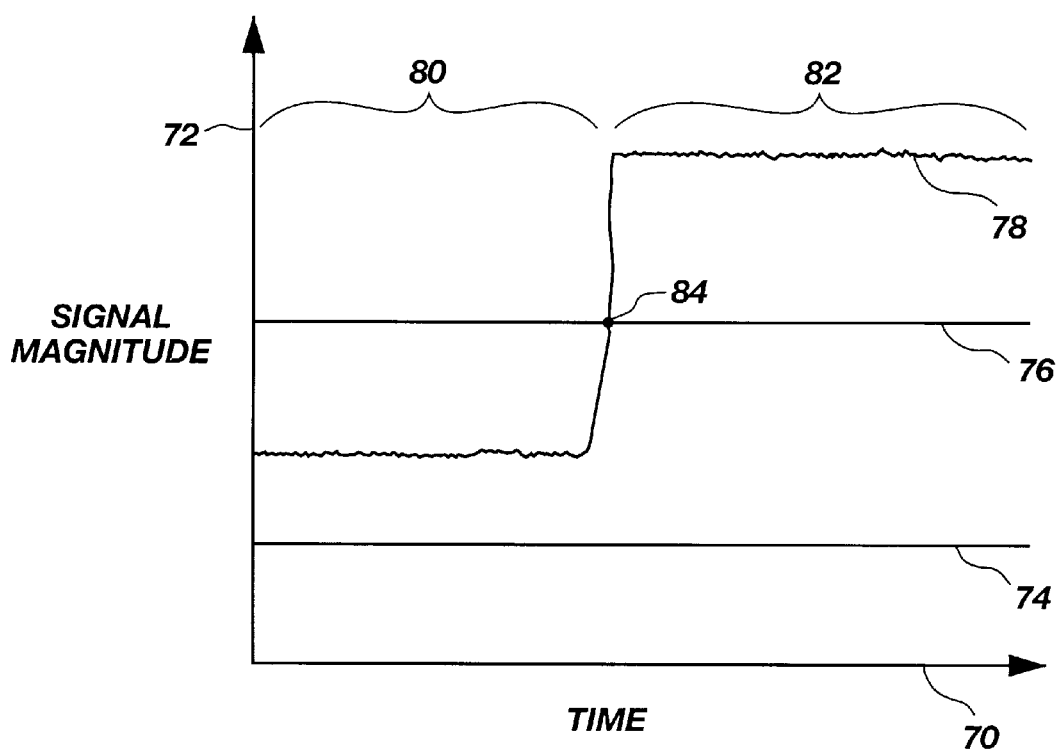
FIG. 8 is a graph showing signal strength (capacitive field disturbance) from the stylus of the present invention, but with the foam cover over the stylus tip.

FIG. 8 is a graph showing the magnitude of capacitive disturbance detected by the touch pad circuitry before and after actuation of the mechanical switch, but with the foam cover 60 of FIG. 5. The most significant difference between FIGS. 7 and 8 is the magnitude of capacitive disturbance detected by the touch pad circuitry. As shown in FIG. 7, the magnitude in signal strength between the non-actuated and actuated switch means is relatively small when compared to the magnitude of signal strength shown in FIG. 8. The advantage of the foam cover then is to amplify the capacitive disturbance so that the second threshold 76 is not inadvertently crossed. It is easier to set the second threshold 76 to be further from the non-actuated switch state and the actuated switch state when there is a greater difference in magnitude of signal strength.

Figure 9:
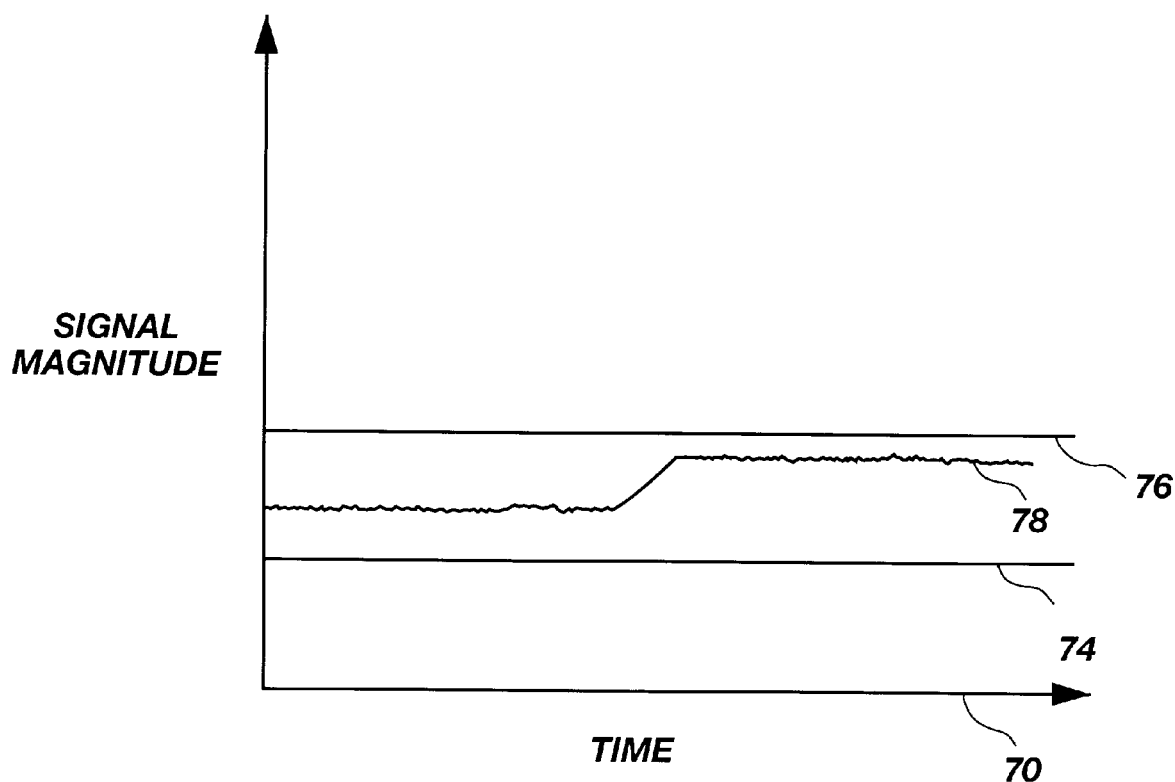
FIG. 9 is a graph showing the capacitive disturbance effect of the stylus of FIGS. 1 and 2 when the stylus is pressed down against the touch pad surface.

For comparison purposes, FIG. 9 is a graph showing the capacitive disturbance effect of the stylus of FIGS. 1A and 1B when the stylus is pressed down against the touch pad surface. The graph is designed to show that the second threshold must fall within a very narrow band of capacitive disturbance because the styli do not provide a sufficient change in conductive mass. Thus, the styli are inadequate for use in a drawing program as described.

Figure 10:
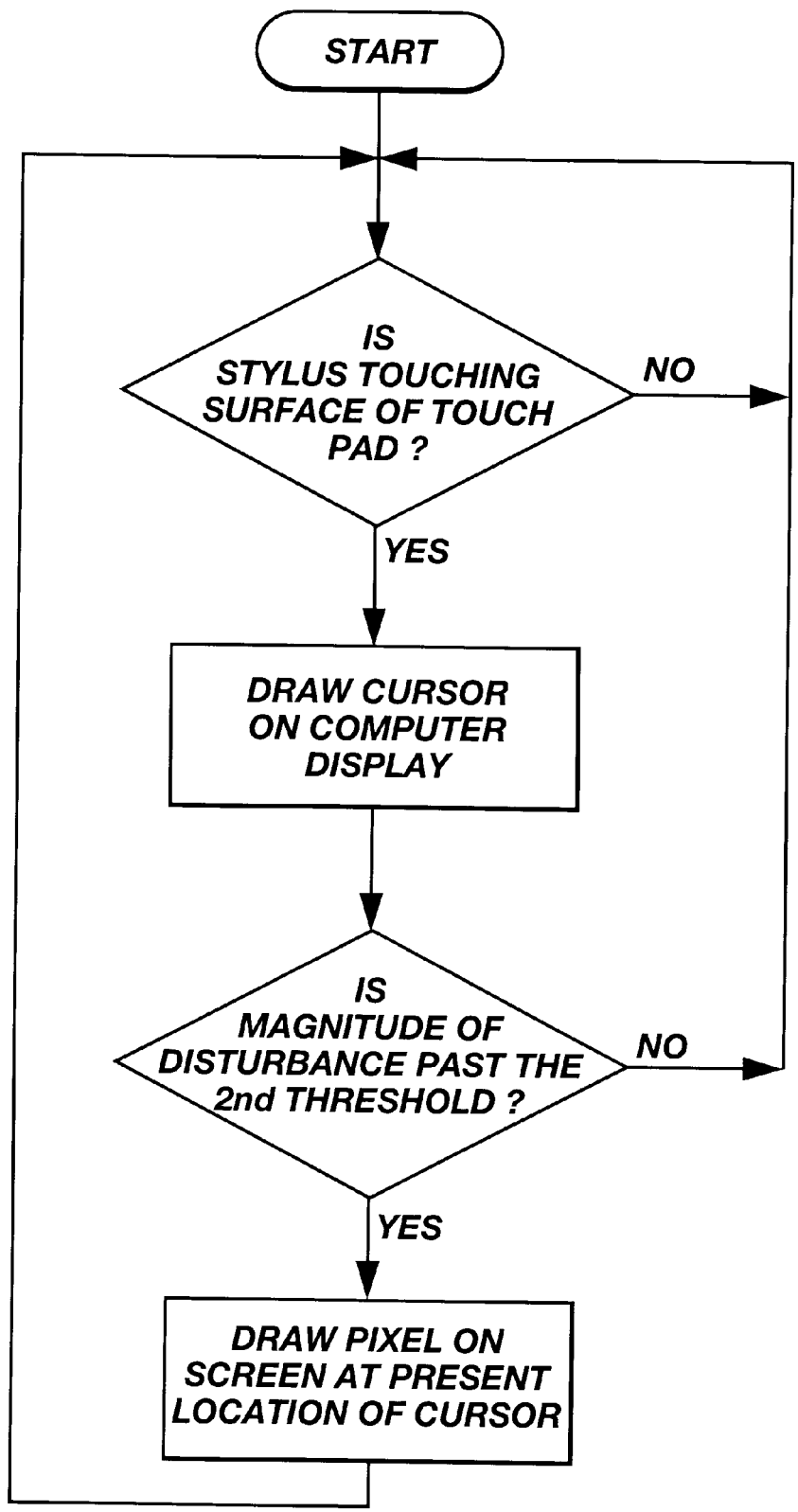
FIG. 10 is a flow chart of the method for determining the strength of the capacitive disturbance caused by stylus of the present invention.

FIG. 10 is a flow chart of the steps which the capacitance sensitive touch pad follows to determine the magnitude of the capacitive disturbance caused by the stylus of the touch pad. The steps also show how this information is used to determine whether the first or second thresholds have been crossed.

Step 1 is a repeated query of the touch pad asking whether the stylus is touching the surface of the touch pad. If not, the query repeats in a loop. It the stylus is touching, the cursor is drawn on the computer display as shown in step 2. Step 3 queries the touch pad circuitry to determine the magnitude of the capacitive disturbance caused by the stylus on the tough pad. If the disturbance is insufficient to cross the second threshold, the method returns to step 1. However, if the second threshold is crossed (indicating the switch means is actuated), a pixel is drawn on the computer display at the present location of the cursor. The loop then returns to step 1.

It is to be understood that the above-described embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A stylus system including a stylus for use with a capacitance sensitive touch pad having a touch sensitive surface, for providing input to an associated computing means, said stylus comprising:

a conductive stylus tip for making contact with the touch sensitive surface of the touch pad;

a conductive mass which is electrically insulated from the conductive stylus tip;

a stylus casing for housing the conductive stylus tip at a first writing end of the casing, and the conductive mass generally spaced apart from the conductive stylus tip;

a manually manipulable means disposed in the stylus casing for manipulation to an actuated position in which the conductive stylus tip is electrically coupled to the conductive mass to thereby increase a capacitive disturbance caused by the conductive stylus tip on the touch pad, or to a non-actuated position in which the conductive stylus tip is electrically insulated from the conductive mass;

a resilient, conductive cover disposed over the conductive stylus tip to amplify the capacitive disturbance when the cover touches the touch sensitive surface; and wherein the touch pad includes a capacitive disturbance sensing means for determining a first magnitude of the capacitive disturbance caused by the conductive stylus tip making contact with the touch sensitive surface of the touch pad.

2. The stylus system as defined in claim 1 wherein the touch pad includes means for generating a signal representing the magnitude of the capacitive disturbance caused by the cover and conductive stylus tip touching the conductive surface of the touch pad for transmittal to the associated computing means.

3. The stylus system as defined in claim 2 wherein the associated computing means includes a computer program having a first selectable signal threshold representing a magnitude of capacitive disturbance which when exceeded causes said computer program to display a cursor on a computer display, said cursor movement being controlled by corresponding movement of the conductive stylus tip across the conductive surface of the touch sensitive touch pad.

4. The stylus system as defined in claim 3 wherein the associated computing means includes a computer program having a second selectable signal threshold representing a magnitude of capacitive disturbance which when exceeded causes said computer program to begin drawing on a computer display beginning at a present location of the cursor, said second threshold being exceeded when the manually manipulable means is actuated so as to substantially increase the capacitive disturbance caused by the conductive stylus tip making contact with the touch sensitive surface of the touch pad.

5. The stylus system as defined in claim 1 wherein the stylus casing has disposed thereon a conductive outer casing material which is electrically coupled to the conductive mass housed within the stylus casing.

6. The stylus system as defined in claim 1 wherein a portion of the stylus casing is replaced by a conductive material electrically coupled to the conductive mass housed within the stylus casing, and electrically insulated from the conductive stylus tip when the manually manipulable means is in a non-actuated position.

7. The stylus system as defined in claim 1 wherein the manually manipulable means comprises a mechanically depressible switch mounted on the stylus casing, said manually manipulable means acting on the conductive mass to electrically couple it to the conductive stylus tip.

8. The stylus system as defined in claim 1 wherein the stylus is more specifically comprised of:

the conductive stylus tip having a front end and a back end, wherein the front end makes contact with the touch sensitive surface of the touch pad, and the back end is formed with a depression therein;

a middle stylus segment having a non-conductive front portion formed to engage the depression of the back end of the conductive stylus tip, and a conductive rear portion coupled to the front end of the conductive stylus tip by an electrically conductive wire;

a spring disposed between the conductive stylus tip and the non-conductive front portion of the middle stylus segment; and the conductive stylus mass being electrically insulated from the rear portion of the middle stylus segment by an air gap therebetween.

9. A method for using a stylus with a capacitance sensitive touch pad having a touch sensitive surface, wherein the capacitance sensitive touch pad provides input to an associated computing means, said method comprising the steps of:

1) selecting a stylus having a manually manipulable means for changing a first magnitude of a capacitive disturbance at a conductive stylus tip of said stylus, and having no other contact with the touch pad or the associated computing means other than the conductive stylus tip which makes contact with a surface of the touch pad, wherein selecting the stylus further comprises:

a) selecting a conductive mass which is electrically insulated from the conductive stylus tip;

b) selecting a casing which houses the conductive stylus tip separate from the conductive mass; and c) selecting the manually manipulable means to electrically couple the conductive stylus tip to the conductive mass when the manually manipulable means is in an actuated position to thereby increase a capacitive disturbance caused by the conductive stylus tip on the touch sensitive surface;

2) selecting a touch pad with a touch sensitive surface which includes sensing means for measuring the first magnitude of the capacitive disturbance, and transmittal means for transmitting a signal representing the first magnitude to the associated computing means;

3) touching the conductive stylus tip to the touch sensitive surface;

4) receiving the signal at the associated computing means from the sensing means; and 5) actuating a function of the associated computing means associated with the magnitude of the capacitive disturbance.

10. The method for using a stylus as defined in claim 9 wherein the step of changing a first magnitude of the capacitive disturbance comprises the additional step of disposing a resilient, conductive cover on the conductive stylus tip so as to amplify the capacitive disturbance when the covered conductive stylus tip touches the touch sensitive surface of the touch pad.

11. The method for using a stylus as defined in claim 10 wherein the step of using a stylus with a capacitance sensitive touch pad which provides input to an associated computing means comprises the additional steps of:

1) programming a computer with a first selectable signal threshold representing a magnitude of capacitive disturbance which when exceeded causes the computer to display a cursor on a computer display; and 2) moving said cursor on the computer display when the signal threshold is exceeded.

12. The method for using a stylus as defined in claim 11 wherein the step of using a stylus with a capacitance sensitive touch pad which provides input to an associated computing means comprises the additional steps of:

1) programming a computer with a second selectable signal threshold representing a magnitude of capacitive disturbance which when exceeded causes said computer to begin drawing on a computer display beginning at a present location of the cursor; and 2) drawing at the present location of the cursor when the second threshold is exceeded.

13. The method for using a stylus as defined in claim 9 wherein the step of selecting a casing which houses the conductive stylus tip separate from the electrically isolated conductive mass comprises the more specific steps of:

1) disposing a conductive outer casing material on the stylus casing which is electrically coupled to the conductive mass housed within the stylus casing, such that the conductive stylus tip remains electrically insulated from the conductive outer casing material when the manually manipulable means is in a non-actuated position; and 2) electrically coupling the conductive outer casing material to the conductive mass housed within the stylus casing.

14. The method for using a stylus as defined in claim 9 wherein the step of selecting a stylus casing for housing the conductive stylus tip comprises the additional steps of:

1) replacing a portion of the stylus casing with a conductive material such that the conductive stylus tip remains electrically insulated from the conductive material of the stylus casing when the manually manipulable means is in a non-actuated position; and 2) electrically coupling the conductive material of the stylus casing to the conductive mass housed within the stylus casing.

15. The method for using a stylus as defined in claim 9 wherein the step of selecting the manually manipulable means comprises the more specific step of providing a mechanically depressible switch mounted on the stylus casing for acting on the conductive mass within the stylus casing to thereby cause it to be electrically coupled to the conductive stylus tip.

16. The method for using a stylus as defined in claim 9 wherein the step of using a stylus with a capacitance sensitive touch pad which provides input to an associated computing means comprises the more specific steps of:

1) selecting the conductive stylus tip having a front end and a back end, wherein the front end makes contact with a surface of the touch pad, and the back end is formed with a depression therein;

2) providing a middle stylus segment having a non-conductive front portion formed to engage the depression of the back end of the conductive stylus tip, and a conductive rear portion coupled to the front end of the conductive stylus tip by an electrically conductive wire;

3) providing a spring disposed between the conductive stylus tip and the non-conductive front portion of the middle stylus segment; and 4) disposing the conductive stylus mass within the stylus easing so as to be electrically insulated from the rear portion of the middle stylus segment.

17. The method for using a stylus as defined in claim 9 wherein the step of using a stylus with a capacitance sensitive touch pad which provides input to an associated computing means comprises the more specific step of coupling a user's hand to the conductive stylus tip via the manually manipulable means so as to substantially increase the magnitude of the capacitive disturbance which is measured by the touch pad.

18. The method for using a stylus as defined in claim 9 wherein the step of using a stylus with a capacitance sensitive touch pad which provides input to an associated computing means comprises the more specific steps of:

1) determining if the magnitude of the capacitive disturbance caused by the stylus exceeds a first predetermined threshold. If not, repeat set 1), otherwise execute step 2).

2) drawing a cursor on a computer display at the location indicated by stylus on the touch pad;

3) determining if the magnitude of the capacitive disturbance caused by the stylus exceeds a second predetermined threshold. If not, return to step 1), otherwise execute step 4).

4) drawing a pixel on the computer display at a present location of the cursor; and 5) returning to step 1).

* * * * *